United States Patent [19]

Nonat

[11] Patent Number: 4,772,782
[45] Date of Patent: Sep. 20, 1988

[54] METHOD OF PERSONALIZING PORTABLE MEDIA SUCH AS CREDIT CARDS

[75] Inventor: Jean-Pierre Nonat, Maule, France
[73] Assignee: Bull S.A., Paris, France
[21] Appl. No.: 899,222
[22] PCT Filed: Dec. 27, 1985
[86] PCT No.: PCT/FR85/00376
§ 371 Date: Jul. 28, 1986
§ 102(e) Date: Jul. 28, 1986
[87] PCT Pub. No.: WO86/04170
PCT Pub. Date: Jul. 17, 1986

[30] Foreign Application Priority Data

Dec. 28, 1984 [FR] France ................................ 84 20027

[51] Int. Cl.⁴ .............................................. G06K 5/00
[52] U.S. Cl. ..................................... 235/380; 235/492
[58] Field of Search ................................. 235/380, 492

[56] References Cited

U.S. PATENT DOCUMENTS 4,467,209 12/1980 Maurer ........................... 235/380 X Primary Examiner—Harold I. Pitts
Attorney, Agent, or Firm—Kerkam, Stowell, Kondracki & Clarke

[57] ABSTRACT

A method for personalizing portable media such as cards having memory comprises writing personalizing data into each card (1) prior to its being put into service. For a mixed card, personalizing data are written onto the magnetic track (2) at the work station (P1), onto the card itself, for instance by stamping, at the work station (P2), and into the memory (5) of the card at the work station (P3).

16 Claims, 3 Drawing Sheets tics of a card to which the method according to the invention is applied;

METHOD OF PERSONALIZING PORTABLE MEDIA SUCH AS CREDIT CARDS

BACKGROUND OF THE INVENTION

The subject of the present invention is a method of personalizing portable media such as cards.

The state of the art in cards having magnetic tracks and, now, having electronic microcircuits (microprocessor and memory) as well, necessitates automated manufacture in order to meet the needs of a large public market.

In general, one must distinguish between at least two preliminary stages in putting a card into circulation, the manufacturing stage and the personalizing stage.

The first stage, which is performed by the manufacturer, comprises equipping the cards with electronic microcircuits, for example a microprocessor and a programmable memory, and perhaps with one or more magnetic tracks.

The second stage is generally done by an authorized issuing organization, which purchases the cards that have been so manufactured and distributes them to future users. Prior to this distribution, these organizations perform personalizing operations, which comprise writing data into the card to identify the issuing entity and the future user of the card, on the one hand, and fixing the conditions and limitations of usage of the card, on the other.

These personalizing data are written into the memory of the electronic microcircuits of the card, by stamping onto the card, and perhaps onto the magnetic tracks.

SUBJECT OF THE INVENTION

The invention relates to a method by which these personalizing operations can be made automatic, to permit production of cards at a rate suitable for a large public market. More particularly, the subject of the invention relates to a method of personalizing at least one portable medium such as a standardized card equipped with electronic microcircuits, such as processing circuits and a memory. Personalizing data is written onto the card and into its memory that enable both the identification of the authorized issuing organization and of the future users of these cards, and that fix the conditions and limitations of usage of the cards. The method comprises the steps of:

constituting a central file grouping together n groups of personalization data attributable respectively to n users;

reading the first group of data and associating it with a first card to be personalized;

extracting from this group first data to be written into the card memory;

writing the first data into the memory;

extracting from this group other data to write onto the card, at least one of other data being correlated with one datum written into the memory;

writing the other data onto the card, for example by stamping; and repeating these operations automatically for the (n−1) other groups of data associated with (n−1) other cards.

BRIEF DESCRIPTION OF THE DRAWINGS

Further characteristics, advantages and details of the invention will become apparent from the ensuing explanatory description, referring to the drawings, in which.

DESCRIPTION OF PREFERRED EMBODIMENTS

Figure 1:
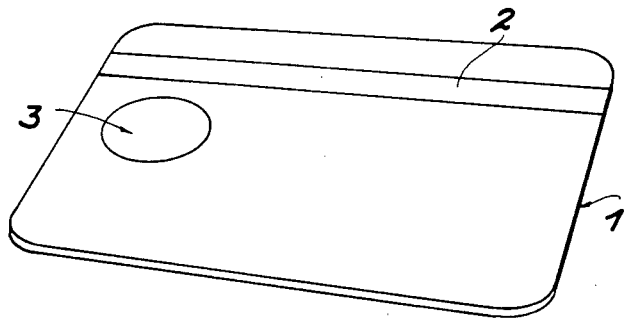
FIGS. 1 and 2 schematically illustrate the characteristics of a card to which the method according to the invention is applied.
Figure 2:
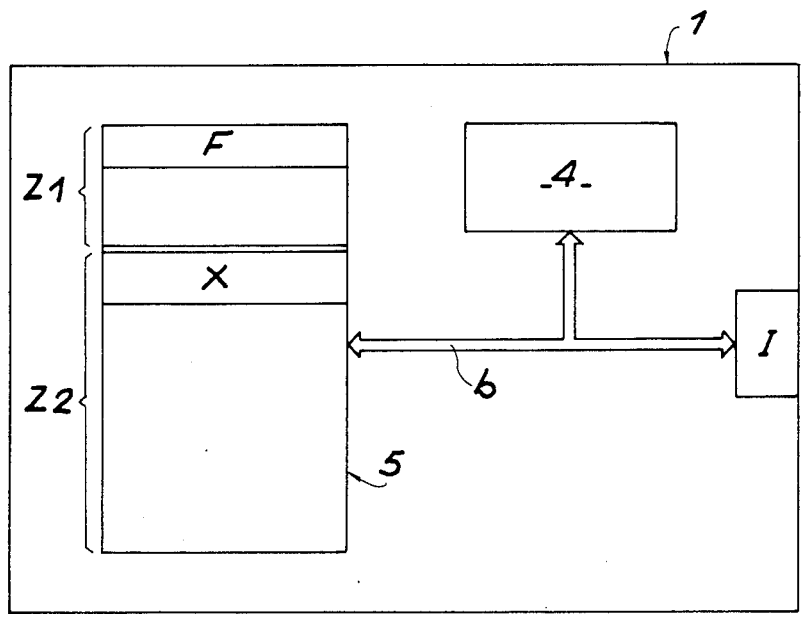

The card 1, shown by way of example in FIG. 1, is a card of the "mixed" type, having at least one magnetic track 2 and electronic microcircuits 3, comprising processing circuits such as a microprocessor 4 and a programmable memory 5 as shown schematically in FIG. 2. These circuits communicate with one another via a linking bus b, and they communicate with the outside via an interface I such as that described, for example, in French Pat. No. 2 483 713 assigned to the assignee of the present invention.

This memory 5 includes at least one memory zone Z1, or secret zone, where the recorded data are not accessible except internally by the microprocessor 4. The other data are recorded in a second memory zone Z2 with access to internal and/or external reading and writing, which are determined as a function of the planned applications for the card 1.

The structure of such a card, in particular at the level of the electronic microcircuits, is described in detail in French Pat. Nos. 2 337 381, 2 401 459 and 2 461 301 assigned to the assignee of the present invention.

The method according to the invention comes into play after the card has been manufactured, that is, after the magnetic tape 2 has been applied to the card 1 and after the microprocessor 4 and the memory 5 have been embedded in the card 1.

The card 1 thus manufactured does not have any data recorded on the magnetic track 2 and is not stamped anywhere. On the other hand, two identifying data by way of example, which are different for each card, are recorded into the programmable memory by the manufacturer these include:

a serial number or manufacturer's number X; and a manufacturer's check digit F, different for each card, and calculated, for example, from the manufacturer's number X and a secret datum s.

Figure 3:
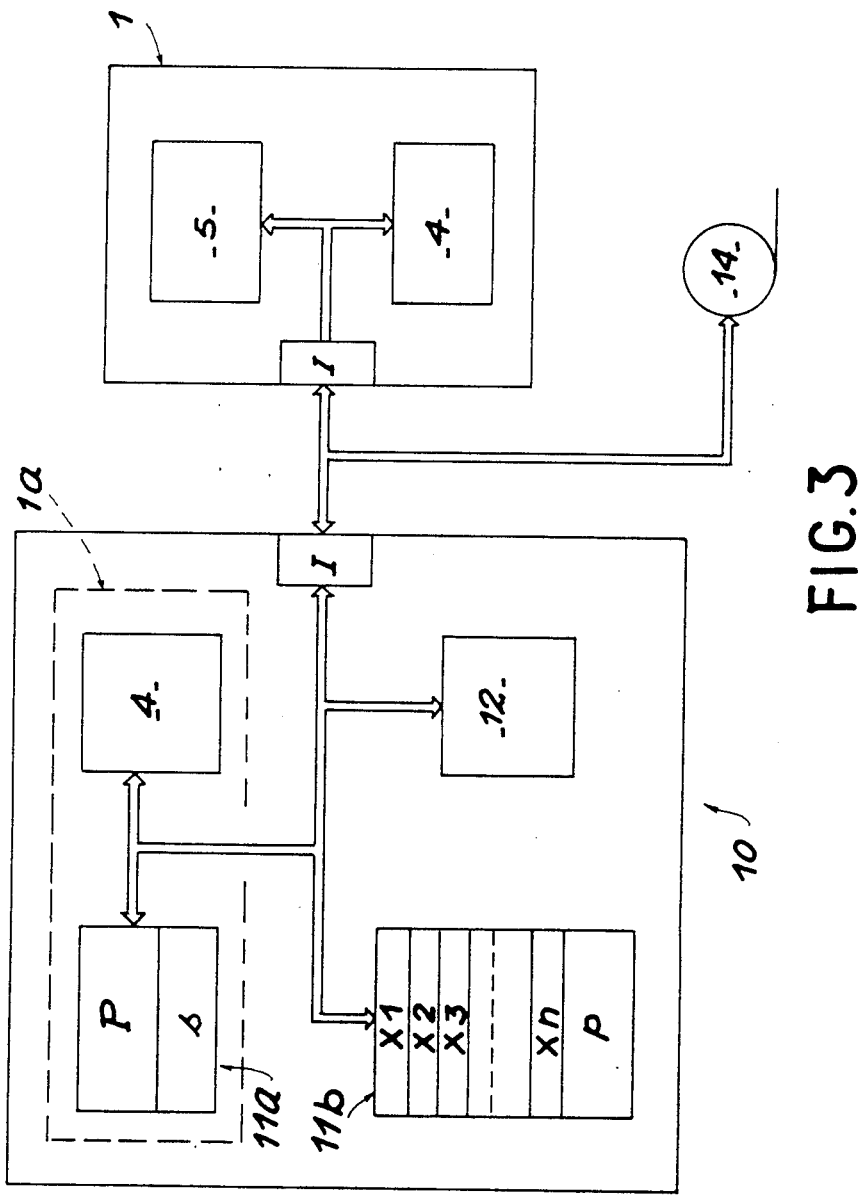
FIG. 3 schematically illustrates the principle of writing identifying data into the memory of the card after its manufacture.

An example of calculating a manufacturer's check digit F is illustrated in FIG. 3.

The manufacturer is equipped with a system 10 that includes at least one memory unit 11a, 11b and processing circuits 12.

An algorithm P for calculating manufacturer's check digits F and the secret datum s is recorded in the first memory zone 11a. A succession of manufacturer's numbers (X1, X2, ... Xn) is recorded in memory zone 11b and is read for example on the basis of a magnetic tape 14 provided beforehand by the manufacturer.

To identify n cards, the manufacturer connects these n cards in succession to the system 10 so as to inscribe a manufacturer's number X and a manufacturer's check digit F into the memory 5 of each card. The first card 1 connected to the system 10 is, for example, assigned to the serial number X1 and a manufacturer's check digit F1 resulting from the execution of the algorithm P by the processing circuits 12, such as $$F1 = P(X1, s).$$

The processing circuits 12, controlled by a writing program p recorded in the memory zone 11b, write the serial number X1 into the memory zone Z2 and write the manufacturer's check digit F1 into the secret memory zone Z1 of the memory 5 of the card 1.

Figure 4:
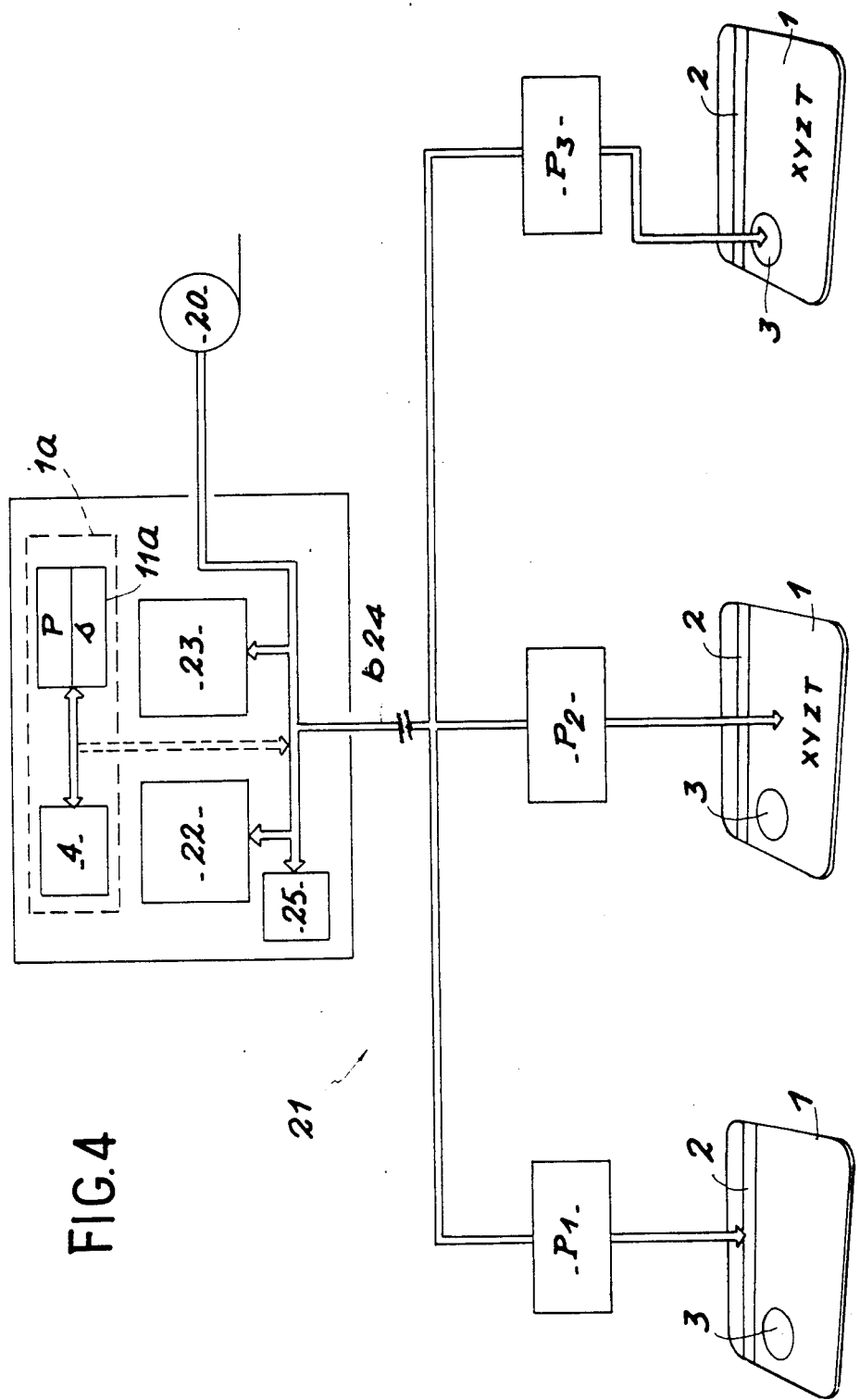
FIG. 4 schematically illustrates the method of personalizing cards.

To attain a higher level of security, the secret datum s, which is common to the n cards, is changed regularly. Advantageously, as shown in FIG. 4, a memory zone 11a and microprocessor 4 is part of a card 1a of the above type, in which the manufacturer's check digit F1 is calculated by the microprocessor 4 of the card 1a.

Once the manufacturer has completed this phase of manufacture, authorized issuing organizations purchase the cards and perform personalizing operations before distributing them to their users. These personalizing operations comprise writing into each card data peculiar to the issuing organization and to the future user, who can then avail himself of the services of this organization under the conditions and limitations set by these data.

These personalizing operations are essentially three in number, for a mixed card, as follows:

encoding of the magnetic track 2;

stamping of the card 1, that is, producing visible writing on the card which enables visual identification of the card, which may be done either by embossing or by flat printing; and encoding of the memory 5.

These operations essentially comprise writing data based on a central file, which is put together beforehand and kept continually up to date by each issuing organization. This central file, recorded for example on magnetic tape, contains n groups of data. These n groups will be assigned respectively to n future users, who are identified after having made a request to the issuing organization.

An example of such a file is shown in the table below, which is limited, for purposes of illustration, to three groups of data corresponding to a banking application.

| Group 1 | Group 2 | Group 3 |
| --- | --- | --- |
| FAMILYNAME1 | FAMILYNAME2 | FAMILYNAME3 |
| FIRSTNAME1 | FIRSTNAME2 | FIRSTNAME3 |
| ISONo1 | ISONo2 | ISONo3 |
| RIB1 | RIB2 | RIB3 |
| DATE1 | DATE2 | DATE3 |
| PIN1 | PIN2 | PIN3 |
| S1 | S2 | S3 |
| S | S | S |
| DATA1 | DATA2 | DATA3 |

Taking group 1 as an example, certain data of the group identify the future user personally: that is, his family name (FAMILYNAME 1), first name (FIRSTNAME 1), and his personal identification code (PIN 1) which enables him to be recognized by the card.

Certain data personalize both the issuing organization, which in the present example happens to be a bank, and each future user. These are the ISO number (ISONo 1) and the check digit RIB (RIB 1). The data S1, S are secret codes which are specific to the issuing organization; the secret code S1 is the scrambled version of the secret code S.

Finally, the data DATE 1 indicate the period of validity of the card, which is determined by the issuing organization.

A personalization sequence is shown schematically in FIG. 4.

The organization issuing the cards 1 makes up a file based on requests by users. One group of data is associated with each user. This file is prerecorded on a magnetic tape 20, for example.

The issuing organization utilizes a personalizing system 21 which includes a memory 22 and processing circuits 23. This system is connected, either remotely or not, via a linking bus b24 with three work stations P1, P2, P3, which are assigned the respective tasks of realizing the above three personalizing operations.

The work station P1 essentially includes a magnetic read/write head of a type known per se.

The work station P1 essentially, and by way of example, comprises a stamping device of a type known per se.

The work station P3 essentially includes a read/write head of a type known per se, which is lowered so as to put it into electrical contact with the output terminals of the microcircuits (3) of the card.

According to a first embodiment, the personalizing operations are performed in the following order: encoding of the magnetic track 2; writing on the card, for example by stamping or embossing; and encoding of the memory 5.

In a first variant, the above-mentioned personalizing operations are performed in succession and continuously according to the chart of the personalizing sequence provided in FIG. 4. Accordingly, this sequence is performed by one and the same machine 21.

For the first personalizing operation, a group of data that is particular to a particular card is not yet assigned. In a quite logical manner, the three cards to be personalized will be respectively assigned the groups of data 1, 2, 3. These three groups of data, comprising the file of the issuing organization, are prerecorded onto the magnetic tape 20 and then transferred into the memory 22 of the system 21.

The operation of encoding the magnetic track 2 of the first card 1 comprises reading the group of data 1 into the memory 22 and extracting from these data the following data, for example, so as to write them onto the magnetic track 2 (at work station P1):

ISONo 1

RIB 1

DATE 1 and S1.

Once the data have been written, they are reread for verification purposes. In case of error, the writing operations are repeated, and the card may be rejected in the event of an anomaly.

Advantageously, the group of data 1 read from the memory 22 is stored temporarily in a buffer memory 25 of the personalizing system 21.

For the second operation, the operation of stamping (at work station P2), it is sufficient to extract the data to be stamped from the buffer memory 25, without reentering them into the memory 22. The data extracted fior stamping are for example FAMILYNAME, FIRSTNAME, ISONo and DATE.

Finally, the last operation involves encoding the memory 5 of the card 1. This last operation is preceded by an operation of verification of the manufacturer's check digit F that was inscribed beforehand by the manufacturer. This check digit F serves to protect the card while it is in transit between the manufacturer and the user, and only the knowledge of this check digit F enables writing the personalizing data into the memory 5 of the card 1.

For each card 1, this verification operation comprises rereading the manufacturer's number X, recalculating the corresponding manufacturer's check digit F, then verifying that this code is indeed identical to the one recorded in the memory zone Z1 of the memory 5. The comparison operation is performed by the card itself, because the memory zone Z1 is not accessible except internally.

The check digit F is recalculated by the processing circuits 23 based on the algorithm P and on the secret datum s rerecorded in the memory 22. Advantageously, this check digit F is recalculated by the processing circuits 4 of the aforementioned card 1a (FIG. 3), the memory 11a of which contains the algorithm P and the secret datum s. This card 1a is connected to the personalization system 21. The same card 1a is thus utilized by both the manufacturer and the organization that issues the cards 1.

Once this verification operation has been done, the memory 5 is encoded at the work station P3.

To do this, it is sufficient to reread the buffer memory 25, so as to extract from it all the information relating to group 1, for example (except for the scrambled secret code S1 which is used solely for the magnetic track), and to write them into the corresponding zones of the memory 5, in particular with the PIN and the secret code S which are inscribed into the secret memory zone Z1.

In a second variant of the first embodiment, the personalizing operations are done in the same order, but the operation of encoding the memory 5 is done by a different machine. In other words, the sequence of personalization comprises two systems 21, with the second system not including the work stations P1, P2.

In this case, the operation of encoding the memory 5 is done in two phases. Once the file on the magnetic tape 20 has been transferred into the memory 22 of the second personalizing system 21, the first phase comprises rereading the magnetic track 21 or stamping of the card that is to be processed, so as to extract a datum enabling the location in the memory 22 of the group of data that has been assigned to this card in the course of the foregoing personalizing operations. This datum is the ISO number, for example. Once the group has been identified, the second phase comprises writing all the data, for example, from groups in the corresponding zones of the memory 5, in particular including the PIN and the secret code S inscribed into the secret memory zone Z1.

The procedure is identical for the groups of data 2, 3 assigned respectively to two other cards, using either the first or the second variant of this first embodiment.

According to a second embodiment, the personalizing operations are performed in the following order: encoding of the memory 5 of the card 1; encoding of the magnetic track 2; and stamping.

According to a first variant, the personalizing operations mentioned above are performed in succession and continuously as shown in the chart showing the sequence of personalization in FIG. 4, but with the work stations in the following order: P3, P1 and P2.

As in the first embodiment, the first operation for encoding the memory 5 comprises, for each card, rereading the manufacturer's number X and recalculating the corresponding manufacturer's check digit F, and then verifying that this check digit is indeed identical to that recorded in the memory zone Z1 of the memory 5.

Once this verification operation has been done, the encoding of the memory 5 of each card is performed.

The first phase comprises transferring the file from the magnetic tape 20 into the memory 22 of the system 21 and assigning data group 1 to the first card to be processed, group 2 to the second card, and so on.

In a second phase, all the data of the groups correspondingly stored in the buffer memory 25 are written for example into the corresponding zones of the memory 5, in particular including the PIN and the secret code S inscribed in the secret memory zone Z1.

The second operations comprises encoding the magnetic track 2 of the cards 1 by taking the data to be written onto the magnetic track 2 from the buffer memory 25 that contains the first group of data 1.

Finally, the third operation, the stamping operation, is performed as in the foregoing embodiment.

In a second variant of the second embodiment, the personalizing operations are done in the same order, but the operations of encoding the magnetic track and stamping are done by a different machine equipped with a personalizing system 21 of the aforementioned type, but not including the work station P3.

Once the file of the magnetic tape 20 has been transferred into the memory 22 of the system 21, the encoding of the magnetic track 2 is done in two phases.

The first phase comprises rereading at least one datum from the memory 5 of the card to be processed and with this datum locating the group of data assigned to this card beforehand during the operation of encoding the memory that was done previously. This datum is for example the ISO number. Once the group has been identified, the second phase comprises writing certain data from the group onto the magnetic track 2. By way of example, the data so written are the following: ISO 1, RIB 1, DATE 1 and S1, as in the foregoing embodiment.

Finally, the third or stamping operation is performed next, as in the foregoing embodiment.

In a third embodiment, it is possible that the stamping operation be performed prior to the operations of encoding the magnetic track 2 and memory 5. In this case, a datum stamped on the card must be reread, so as to locate the group of data assigned to this card in the central file. Although this is conceivable, it is nevertheless easier to reread the magnetic track 2 or the memory 5, and so the two embodiments described above are better adapted to improved industrialization. In this third embodiment, it is possible that after stamping, the operation of encoding the magnetic track be performed and then the operation of encoding the memory, or vice versa, these two operations being performed on the same machine or on different machines, on the same principles as those described for the first two embodiments.

It will be understood that the personalizing operations are not limited to writing data onto a magnetic track or into a memory and performing stamping of the card. By way of example, the method according to the invention may include the application of a photograph of the future user to the card. This photograph may be recorded numerically and included in the DATA of each group of data that identifies or personalizes the future user of the card. It is equally possible for data to be written by an optical method, such as a laser, on a pre-treated surface of the card.

In a variant, the method according to the invention may also be applied to a card that is equipped with electronic microcircuits but has no magnetic track 2. In that case, the method is limited to encoding of the memory 5 and writing onto the card, for example by stamping. Advantageously, the method begins with the encoding of the memory 5, and then stamping is performed on the same principle as that described for the second embodiment.

The personalizing operations are preceded by testing operations at the end of manufacture, by which assurance that all the elements of the card are properly functional is gained. These operations substantially comprise writing and rereading at least one datum in the memory of the electronic microcircuits and on the magnetic track.

Finally, the initial operation, comprising writing the serial number X and the manufacturer's check digit F into each card, as described in conjunction with FIG. 3, can be integrated into the personalization sequence. This may be done when the manufacturer is also the organization issuing the cards. It will be understood that the serial number X and the manufacturer's check digit F given by way of example may be replaced with data or parameters having some other significance instead.

What is claimed is:

1. A method of personalizing a standardized card embodying electronic microcircuits, including processing circuits and a memory, wherein personalizing data is written onto the card and into the memory of the card to enable both identification of an issuing organization of the card and of a user of the card, and to fix conditions and limitations of usage of the card, comprising the steps of prerecording, during manufacture of the card, a first manufacturer's check digit into a secret zone of the memory which is inaccessible from outside of the card; constituting a central file by grouping together n groups of personalization data attributable respectively to n users; reading a first group of data from the central file and associating the data with the card to be personalized; extracting from the first group first data to be written into the card memory; calculating from the first data a second manufacturer's check digit; comparing, within the card, the second check digit with the first check digit prerecorded into the secret zone of the memory; and invalidating the card if the first and second check digits are different; otherwise, writing the first data into the memory; extracting from the first group other data to be written onto the card; writing the other data onto the card; and repeating the foregoing steps automatically for (n−1) other groups of data to personalize (n−1) other cards.

2. A method of personalizing a standardized card having a magnetic track thereon and embodying electronic microcircuits, including processing circuits and a memory, wherein personalizing data is written onto the card, onto the magnetic track, and into the memory that enable both identification of an issuing organization of the card and of a user of the card, and the fixing conditions and limitations of usage of the card, comprising the steps of prerecording, during manufacture of the card, a first manufacturer's check digit into a secret zone of the memory which is inaccessible from outisde of the card; constituting a central file by grouping together n groups of personalization data attributable respectively to n users; reading a first group of data from the central file and associating the data with the card to be personalized; extracting from the first group first data to be written onto the magnetic track of the card; calculating from the first data a second manufacturer's check digit; comparing within the card the second check digit with the first check digit prerecorded into the secret zone of the memory; and invalidating the card if the first and second check digits are different; otherwise, writing the first data onto the magnetic track; extracting from the first group second data to be written onto the card; writing the second data onto the card; and repeating the foregoing steps automatically for (n−1) other groups of data associated with (n−1) other cards to be personalized.

3. A method of personalizing a standardized card having a magnetic track and electronic microcircuits, including processing circuits and a memory, wherein personalizing data is written onto the card, onto the magnetic track, and into the memory that enable both identification of an issuing organization of the card and of a user of the card, and the fixing of conditions and limitations of usage of the card, comprising the steps of prerecording, during manufacture of the card, a first manufacturer's check digit into a secret zone of the memory which is inaccessible from outside of the card; constituting a central file by grouping together n groups of personalization data attributable respectively to n users; reading a first group of data from the central file and associating the data with a first card to be personalized; extracting from the first group first data to be written into the memory of the card; calculating from the first data a second manufacturer's check digit; comparing within the card the second check digit with the first check digit prerecorded in the secret zone of the memory; and invalidating the card if the first and second check digits are different; otherwise, writing the first data into the memory; extracting from the first group second data to be written onto the magnetic track; writing the second data onto the magnetic track; extracting from the first group third data to be written onto the card; writing the third data onto the card; and repeating the foregoing steps automatically for (n−1) other groups of data associated with (n−1) other cards.

4. A method according to claim 1, wherein the manufacturer's check digit is a function of a serial number (X) assigned to the card during its manufacture.

5. A method according to claim 4, wherein the manufacturer's check digit is also a function of a secret datum (s).

6. A method according to claim 1, wherein the step of writing the other data onto the card comprises:
   reading a personalizing datum written into the memory of the card;
   locating in the central file, using the datum, the group of data associated with the card;
   extracting from the group the other data to be written; and
   writing said extracted other data onto the card.

7. A method according to claim 2, wherein the step of writing second data onto the card comprises the steps of:
   reading a personalizing datum previously written onto the magnetic track of the card;
   locating in the central file, using the personalizing datum, the group of data associated with the card;
   extracting from the group the second data to be written; and
   writing said extracted second data onto the card.

8. A method according to claim 2 further comprising writing personalizing data into the memory of the card by:

extracting from the group the personalizing data to be written into the memory using at least one datum previously written onto the magnetic track and which is correlated with the personalizing data; and writing the extracted personalizing data into the memory.

9. A method according to claim 8, wherein the step of writing into the memory of the card comprises the steps of:

reading the personalizing datum previously written onto the magnetic track of the card;

locating in the central file, using the personalizing datum, the group of data associated with the card;

extracting from the group the personalizing data to be written into the memory; and writing said extracted personalizing data into the memory.

10. A method according to claim 2, wherein the manufacturer's check digit is a function of a serial number (X) assigned to the card during its manufacture.

11. A method according to claim 10, wherein the manufacturer's check digit is also a function of a secret datum (s).

12. A method according to claim 3, wherein the manufacturer's check digit is a function of a serial number (X) assigned to the card during its manufacture.

13. A method according to claim 12, wherein the manufacturer's check digit is also a function of a secret datum (s).

14. A method according to claim 3, wherein the step of writing on the magnetic track comprises the steps of:

reading a personalizing datum previously written into the memory of the card;

locating in the central file, using the personalizing datum, the first group of data associated with the card;

extracting from the group the data to be written; and writing said extracted data onto the magnetic track.

15. A method according to claim 12, wherein the step of writing onto the card comprises the steps of:

reading a personalizing datum previously written into the memory of the card;

locating in the central file, using the personalizing datum, the first group of data associated with the card; and writing said extracted data onto the card.

16. A method according to claim 13, wherein the step of writing onto the card comprises the steps of:

reading a personalizing datum previously written onto the magnetic track of the card;

locating in the central file, using the personalizing datum, the first group of data associated with the card;

extracting from the group the data to be written; and writing said extracted data onto the card.

* * * * *